United States Patent
Wang

(10) Patent No.: US 9,915,069 B1
(45) Date of Patent: Mar. 13, 2018

(54) NON-BLACK EPDM ROOF MEMBRANES WITH IMPROVED WEATHERING

(71) Applicant: FIRESTONE BUILDING PRODUCTS CO., LLC, Indianapolis, IN (US)

(72) Inventor: Hao Wang, Carmel, IN (US)

(73) Assignee: Firestone Building Products Co., LLC, Nashville, TN (US)

(*) Notice: Subject to any disclaimer, the term of this patent is extended or adjusted under 35 U.S.C. 154(b) by 255 days.

(21) Appl. No.: 14/790,659

(22) Filed: Jul. 2, 2015

Related U.S. Application Data

(63) Continuation of application No. 12/982,198, filed on Dec. 30, 2010, now abandoned.

(60) Provisional application No. 61/291,579, filed on Dec. 31, 2009.

(51) Int. Cl.
| | | |
|---|---|---|
| B32B 27/08 | (2006.01) | |
| C08F 210/00 | (2006.01) | |
| E04D 5/06 | (2006.01) | |
| C08K 3/36 | (2006.01) | |
| C08K 5/3435 | (2006.01) | |
| B32B 25/04 | (2006.01) | |
| B32B 25/10 | (2006.01) | |
| B32B 25/02 | (2006.01) | |
| B29C 43/24 | (2006.01) | |
| B29C 35/02 | (2006.01) | |
| B29K 23/00 | (2006.01) | |
| B29K 105/24 | (2006.01) | |
| B29K 105/00 | (2006.01) | |
| B29L 31/10 | (2006.01) | |

(52) U.S. Cl.
CPC ............ *E04D 5/06* (2013.01); *B29C 35/02* (2013.01); *B29C 43/24* (2013.01); *B32B 25/02* (2013.01); *B32B 25/042* (2013.01); *B32B 25/10* (2013.01); *C08K 3/36* (2013.01); *C08K 5/3435* (2013.01); *B29K 2023/16* (2013.01); *B29K 2105/0044* (2013.01); *B29K 2105/24* (2013.01); *B29L 2031/108* (2013.01); *B32B 2307/712* (2013.01); *B32B 2323/16* (2013.01); *B32B 2419/06* (2013.01)

(58) Field of Classification Search
CPC ........... E04D 5/06; B29C 35/02; B29C 43/24; B32B 25/02; B32B 25/042; B32B 25/10; B32B 2307/712; B32B 2419/06; C08K 3/36; C08K 5/3435; B29K 2023/16; B29K 2105/0044; B29K 2105/24; B29L 2031/108
USPC .......................................... 428/517; 526/348
See application file for complete search history.

(56) References Cited

U.S. PATENT DOCUMENTS

| | | | |
|---|---|---|---|
| 2,619,481 A | | 11/1952 | Baldwin et al. |
| 3,280,082 A | | 10/1966 | Natta et al. |
| 5,162,436 A | * | 11/1992 | Davis .......... C08J 5/18 524/505 |
| 5,468,550 A | | 11/1995 | Davis et al. |
| 5,854,327 A | * | 12/1998 | Davis .......... C08J 5/18 524/445 |
| 6,075,092 A | | 6/2000 | Nakamura et al. |
| 6,130,299 A | | 10/2000 | Sone et al. |
| 6,133,414 A | | 10/2000 | Pfaendner et al. |
| 6,344,506 B2 | | 2/2002 | Vasseur |
| 6,492,476 B1 | | 12/2002 | Knauf et al. |
| 7,053,159 B2 | | 5/2006 | Inoue |
| 2002/0026013 A1 | | 2/2002 | Lundquist et al. |
| 2004/0097620 A1 | | 5/2004 | Kaprinidis |
| 2007/0149728 A1 | | 6/2007 | Vestberg |
| 2008/0146745 A1 | | 6/2008 | Luo et al. |
| 2008/0188600 A1 | | 8/2008 | Westwood et al. |
| 2009/0320987 A1 | * | 12/2009 | Hubbard ............ B32B 7/06 156/71 |

FOREIGN PATENT DOCUMENTS

| EP | 1571177 A1 | 9/2005 |
|---|---|---|
| EP | 1939221 A2 | 7/2008 |

OTHER PUBLICATIONS

G. Capocci & M. Hubbard, "A Radically New UV Stabilizer for Flexible PVC Roofing Membranes", Journal of Vinyl & Additive Technology, 2005, pp. 91-94.

* cited by examiner

*Primary Examiner* — William Cheung
(74) *Attorney, Agent, or Firm* — Thomas Kingsbury; Arthur M. Reginelli

(57) ABSTRACT

A non-black roofing membrane comprises an EPDM rubber; a non-black filler; a UV light stabilizer selected from the group consisting of NOR-HALS of the formula

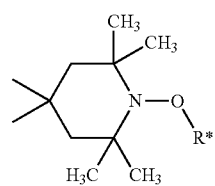

wherein R* is $C_1$-$C_{20}$alkyl, OH-substituted $C_1$-$C_{20}$alkyl, optionally $C_1$-$C_4$ alkyl-substituted $C_5$-$C_{12}$cycloalkyl, $C_7$-$C_9$phenylalkyl or O- or S-interrupted $C_2$-$C_{20}$alkyl, preferably $C_1$-$C_{12}$alkyl, benzyl or $C_5$-$C_8$ cycloalkyl especially $C_6$-$C_{10}$alkyl or cyclohexyl; and a cure package. The resultant roofing membrane provides increased weathering resistance.

17 Claims, No Drawings

NON-BLACK EPDM ROOF MEMBRANES WITH IMPROVED WEATHERING

This application is a continuation of U.S. Ser. No. 12/982,198 filed on Dec. 30, 2010, now abandoned, which is a Non-Provisional Application of U.S. Provisional Application Ser. No. 61/291,579, filed on Dec. 31, 2009, both of which are incorporated herein by reference.

TECHNICAL FIELD

The present invention generally relates to sheeting material used for applications such as roofing. More particularly, the present invention relates to non-black, sulfur-cured EPDM sheeting material of the type that is devoid of black pigments or carbon black. Specifically, the present invention relates to an EPDM sheeting material having a UV light stabilizer that does not become deactivated upon thermal or photo-oxidation, or upon the rubber's mixing and curing processes. A method is also provided for covering the roofs of buildings which includes the step of employing the sheeting material of the present invention.

BACKGROUND OF THE INVENTION

Ethylene-propylene-diene terpolymer (EPDM) is extensively used in a variety of applications. For example, it is particularly useful as a polymeric sheeting material, which, because of its excellent physical properties, flexibility, weathering resistance, low temperature properties and heat aging resistance, has gained acceptance as a roofing membrane for covering industrial and commercial roofs. These roofing membranes are typically applied to the roof surface in a vulcanized or cured state and serve as an effective barrier to prevent the penetration of moisture to the covered roof.

Traditional EPDM roofing membranes are generally black or very dark in color, and are typically prepared by compounding the base polymer of EPDM with one or more carbon black fillers, processing oil, and other desired ingredients such as plasticizers, antidegradants, adhesive-enhancing promoters, etc., in a suitable mixer, and calendering the resulting compound into the desired thickness. The roofing membrane may also be cured by vulcanizing the resultant sheet in the presence of one or more vulcanizing agents and/or compatible vulcanizing accelerators. Vulcanizing agents such as sulfur or sulfur-donating compounds such as mercaptans are typically used, although vulcanization and curing may be done using other agents or in the presence of other compounds.

While black or dark-colored EPDM membranes have been used for decades as commercial single-ply roofing membranes, such membranes are known to absorb sunlight and become hot. This has lead to various environmental and energy concerns. In recent years, great efforts have been made toward producing white and/or other non-black membranes, including not only EPDM membranes but also thermoplastic olefin (TPO) membranes, that are more environmentally friendly and more energy efficient. Various mineral fillers such as clay, talc, silicas, mica, calcium carbonate, and the like, either individually or in various combinations, have been added to various roofing membrane formulations to improve energy absorption characteristics.

Because non-black or light colored membranes do not have black pigments or carbon black in them to absorb UV light, UV stabilizers have been needed in the membranes to prevent the polymers from degrading in the sunlight. UV light stabilizers have been used in various TPO formulations (TPO is a thermoplastic material) where the formulations are to be used in membranes for outdoor use. For instance, a typical UV light stabilizer for plastic products, including TPO membranes, is a hindered amine light stabilizer, also referred to as HALS. HALS acts as a radical scavenger. Through the formation of nitroxyl radicals, hindered amines terminate and deactivate any alkyl radicals and/or peroxide radicals that may participate in the photo-oxidation process.

Unfortunately, due to the strong basic nature of the hindered amines, HALS cannot be used in thermoplastic roof membranes that are acidic in nature, such as polyvinyl chloride (PVC) membranes. It is well known that PVC releases hydrochloric acid (HCl) upon thermal and photo-oxidation. It is believed that the HCl combines with HALS and obstructs the stabilizer's ability to form nitroxyl radicals, thereby impairing the scavenger ability of the HALS. It is further believed that membranes containing EPDM rubber in their formulations could not use HALS due to similar, but not identical, reasons as those above. It is believed that HALS reacts with one or more ingredients, e.g., a filler, a curative, the EPDM rubber, during the rubber mixing and/or curing processes, the reaction causing the HALS to not form the necessary nitroxyl radicals, due at least in part to the high-temperature reactive environment.

Nevertheless, the use of HALS as a radical scavenger and UV light stabilizer would be beneficial in non-black EPDM membranes, if it would not be deactivated by acids or by the high-temperature processes as required in the production of EPDM membranes. Thus, the need exists for a HALS-based UV light stabilizer suitable for use in a non-black EPDM membrane and, more specifically in one embodiment, a sulfur-cured EPDM membrane.

SUMMARY OF THE INVENTION

One or more embodiments of the present invention provide a non-black roofing membrane comprising an EPDM rubber; from about 10 parts to about 300 parts by weight of a non-black filler per 100 parts by weight rubber; from about 0.1 parts to about 10 parts by weight of a UV light stabilizer selected from the group consisting of NOR-HALS; and a cure package. In one or more embodiments, the non-black roofing membrane may be a single-ply membrane. In one or more embodiments, the non-black EPDM roofing membrane with the NOR-HALS stabilizer has effective UV light stability when measured by a Xenon Arc weathering test. In one or more embodiments, the non-black roofing membrane with the NOR-HALS stabilizer has much less cracking and damage due to exposure for 10,000 hours in the Xenon Arc weathering test, than does a comparable membrane that does not include the NOR-HALS stabilizer.

One or more embodiments of the present invention further provide a method for the production of a non-black roofing membrane comprising mixing an EPDM rubber, a non-black filler, and a UV stabilizer containing a NOR-HALS stabilizer in a masterbatch to form an uncured compound, calendering the uncured compound into one or more layers to form a sheet, and curing the calendered uncured compound such that the EPDM rubber has improved resistance to UV light as compared to an EPDM membrane made comparably, but without the NOR-HALS stabilizer.

One or more embodiments of the present invention still further provide a laminate membrane comprising a non-black first layer including the cured EPDM rubber, non-black filler and NOR-HALS UV light stabilizer as described above; and a second layer including cured elastomeric olefinic copolymer and carbon black, and optionally, a scrim fabric.

DETAILED DESCRIPTION OF AN EMBODIMENT OF THE INVENTION

At least one representative embodiment of the present invention is directed toward a non-black roofing membrane or sheeting material that includes a EPDM rubber; one or more non-black reinforcing fillers (e.g., silica, clay, talc, mica, calcium carbonate); and a UV light stabilizer selected from a group of hindered amine light stabilizers known as NOR-HALS. Prior non-black EPDM roof sheeting materials were devoid of any UV light stabilizers that contained hindered amines, primarily because mixing and processing and curing temperatures for the production of the masterbatch of the ingredients are so high that the HALS stabilizer would react with one or more of the other ingredient and, hence, obstruct the stabilizer's ability to form nitroxyl radicals.

In addition, even if it were possible to blend a hindered amine light stabilizer (HALS) into the masterbatch at reasonable temperatures so as not to destroy the stabilizer's ability to form nitroxyl radicals, the curing process for producing a vulcanized EPDM rubber roofing membrane or sheeting material requires a temperature that would have, heretofore, obstructed the formation of nitroxyl radicals by the stabilizer during the curing process. Thus, prior to this invention, no hindered amines were capable of forming nitroxyl radicals during the mixing and curing processes required for the production of EPDM roofing membranes or sheeting material. For instance, EPDM rubber roofing membranes are typically cured at a high temperature, on the order of about 300° F. (about 160° C.) or more, for a relatively short period of time, on the order of less than one hour, e.g., about 45 minutes, or at lower temperatures, on the order of about 280° F. or less, for a relatively long period of time, on the order of 3 hours or more. In curing the EPDM rubber membrane, it has been found that hindered amines other than the NOR-HALS interfere with the curing process by affecting the crosslinking of the rubber. This problem is not present with PVC plastic, as PVC would melt at such temperatures.

In the present invention, a new group of hindered amines have been found that will not be become deactivated by the mixing and curing processes associated with the production of EPDM membranes or sheeting material. These UV stabilizers, heretofore, were found not to become deactivated by acids such as HCl. Thus, this new group of hindered amines has been shown to be suitable for use in the production of cured plastic articles made of PVC, as noted in the Journal of Vinyl & Additive Technology 2005, in an article entitled "A Radically New UV Stabilizer for Flexible PVC Roofing Membranes" by Gerald Capocci et al., the disclosure of which is incorporated herein by reference. These new types of hindered amines (HALS) provide for an O—R group to attach to the hindered amine, and are known in the industry as NOR-HALS. Thus, they are not strong bases and, as such, do not become deactivated by acids. It has now been found that the NOR-HALS can survive the harsh EPDM mixing and curing processes, and other high-temperature reactive environments, to provide a non-black filled EPDM membrane with improved UV stabilization or improved weathering resistance. Suitable examples include a proprietary compound sold under the trademark Tinuvin XT 833™ by Ciba Geigy.

In one or more embodiments, a vulcanizable composition including not only a vulcanizable EPDM polymer and a non-black reinforcing filler, but also a UV stabilizer selected from the group consisting of NOR-HALS is provided. An uncured rubber sheet can be formed from this composition and cured such that, upon curing, the UV stabilizer remains unobstructed in its formation of nitroxyl radicals and is free to act as a radical scavenger. In one or more embodiments, the NOR-HALS act to reduce the affects of UV light, via thermal- and photo-oxidation, on the non-black filled EPDM membranes, so as to provide advantageous weathering resistance properties to the composition.

In one or more embodiments, the EPDM membranes of the present invention are monolithic membranes. These membranes include those where the composition of the membrane (excluding any optional scrim) is homogeneous throughout the thickness of the membrane. In one or more embodiments, these monolithic membranes derive from a single calendered sheet. In one or more embodiments, these monolithic membranes may optionally include a scrim such as a reinforcing scrim. Membranes including a scrim fabric may be referred to as composite membranes.

In other embodiments, the membranes of the present invention are laminate membranes including at least one non-black layer prepared from a non-black rubber formulation as described herein. In one or more embodiments, these laminate membranes include at least one layer including carbon black as a filler. In certain embodiments, these bi-laminate membranes may be composites and include scrim.

In either event, the membranes of the present invention include at least one non-black polymeric layer that derives from the non-black vulcanizable compositions described herein. The membranes of the present invention (or at least one non-black layer of the membranes of the present invention) are prepared from non-black vulcanizable compositions of matter that include an EPDM rubber, a non-black reinforcing filler, a curative, and a UV stabilizer. They may be simply referred to as vulcanizable compositions. Optional ingredients may also be added.

In one or more embodiments, useful rubber includes elastomeric olefinic copolymer rubber, which may simply be referred to as olefinic rubber, olefinic copolymer, or simply rubber. In one or more embodiments, useful olefinic rubber includes rubber that is capable of being cured or crosslinked with sulfur or sulfur-based cure systems.

In one or more embodiments, the olefinic copolymer is a terpolyer that includes mer units that derive from ethylene, α-olefin, and optionally diene monomer. Useful α-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082, which is incorporated herein by reference. For purposes of this specification, elastomeric olefinic copolymers may be referred to as elastomeric olefinic terpolymers, terpolymers, or simply EPDM.

In one or more embodiments, the terpolymer may include at least 55 weight percent, in other embodiments at least 60 weight percent, in other embodiments at least 62 weight percent, and in other embodiments at least 64 weight percent mer units deriving from ethylene; in these or other embodiments, the elastomeric terpolymer may include less than about 73 weight percent, in other embodiments less than about 70 weight percent, and in other embodiments less than about 69 weight percent, mer units deriving from ethylene.

In one or more embodiments, the elastomeric terpolymer may include at least 1 percent by weight, in other embodiments at least 1.5 percent by weight, in other embodiments at least 2 weight percent, in other embodiments at least 2.4 weight percent, mer units deriving from diene monomer; in these or other embodiments, the elastomeric terpolymer may include less than about 4 weight percent, and in other embodiments less than about 3.2 weight percent, mer units deriving from diene monomer. In one or more embodiments, the balance of the mer units derive from propylene or other α-olefins. In particular embodiments of the present invention, the use of a silane coupling agent may advantageously provide for the use of terpolymer rubber having relatively low amounts of diene; for example, terpolymer rubber including from about 1 to about 2 percent, or in other embodiments from about 1.3 to about 1.7 percent, mer units deriving from diene monomer may be used.

In one or more embodiments, the useful elastomeric olefinic terpolymer (EPDM) may be characterized by a Mooney Viscosity ($ML_{1+4}$@125° C.) of about 35 to about 70, and in other embodiments from about 50 to about 70.

Useful EPDM varieties are commercially available. Examples include Royalene® 512, which has a Mooney Viscosity ($ML_{1+4}$@125° C.) range of 52 to 67, and an ethylene to propylene ratio of 68/32. Other example EPDMs suitable for the present invention include, but are not limited to, Royalene® 4569 and Royalene® 502.

In one or more embodiments, the EPDM membrane is cured or crosslinked. In one or more embodiments, the EPDM membrane is cured at a temperature of at least about 150° C.; in another embodiment, at least about 160° C.; and in another embodiment at least about 170° C. In another embodiment, the EPDM membrane may be cured in an autoclave in the presence of steam and pressure. In yet another embodiment, the EPDM membrane may be cured at a temperature of less than about 150° C., but the EPDM membrane curing process will extend at least 3 hours or more, not less than one hour as in the other embodiments noted above.

EPDM can be cured by using numerous techniques such as those that employ sulfur cure systems, peroxide cure systems, and quinone-type cure systems. The sulfur cure systems may be employed in combination with vulcanizing accelerators. Useful accelerators include thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazolesulfenamide, N-tert-butyl-2-benzothiazole sulfenamide (TBBS) (available as Delac® NS from Chemtura, Middlebury, Conn.) and the like; other thiazole accelerators such as 2-mercaptobenzothiazole (MBT), benzothiazyl disulfide (MBTS), N,N-diphenylguanidine, N,N-di-(2-methylphenyl)-guanidine, 2-(morpholinodithio)benzothiazole disulfide, zinc 2-mercaptobenzothiazole and the like; dithiocarbamates such as tellurium diethyldithiocarbamate, copper dimethyldithiocarbamate, bismuth dimethyldithiocarbamate, cadmium diethyldithiocarbamate, lead dimethyldithiocarbamate, sodium butyldithiocarbamate, zinc diethyldithiocarbamate, zinc dimethyldithiocarbamate, zinc dibutyldithiocarbamate (ZDBDC) and mixtures thereof. Sulfur donor-type accelerators (e.g. di-morpholino disulfide and alkyl phenol disulfide) may be used in place of elemental sulfur or in conjunction with elemental sulfur if desired.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoyl) peroxide, phenylacetyl peroxide, and mixtures thereof.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and mixtures thereof.

Examples of polysulfide activators for the quinone-type co-curing agents include calcium polysulfide, sodium polysulfide, as well as organic polysulfides having the general formula R—$(S)_x$—R, wherein R is a hydrocarbon group and x is a number from 2-4. Examples of organic polysulfides are disclosed in U.S. Pat. No. 2,619,481, which is incorporated herein by reference.

Conventional radiation equipment and techniques can optionally be employed in the practice of this invention. Suitable ionizing crosslinking promoters that can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). These chemical additives are preferably compatible with the other ingredients in the composition; they may also function to reduce the dosage of ionizing radiation needed to obtain the desired level of crosslinking.

Sulfur and sulfur-containing cure systems may be used, and may also be used with an accelerator. Suitable amounts of sulfur can be readily determined by those skilled in the art. In one or more embodiments roughly about 1 part by weight (pbw) sulfur per 100 parts by weight rubber (phr) may be used. The amount of accelerator can also be readily determined by those skilled in the art.

In one or more embodiments, non-black reinforcing fillers include mineral fillers that are characterized by a particle size (average diameter or cross-section) of less than 10 microns, in other embodiments less than 5 microns, and in other embodiments less than 1 micron. In these or other embodiments, these fillers are characterized by a particle size of at least 10 nanometers, in other embodiments at least 50 nanometers, and in other embodiments at least 100 nanometers. Suitable amounts of non-black reinforcing fillers may include from 0 parts by weight (pbw) per 100 parts by weight rubber (phr) to 300 parts by weight (pbw) per 100 parts by weight rubber (phr). In another embodiment, the amounts may range from 10 parts to 150 parts by weight phr, and in another embodiment, from 40 parts to 100 parts by weight phr.

In one or more embodiments, one or more non-black reinforcing fillers include a moiety or group that is capable of providing a non-black color to an EPDM sheeting material or roofing membrane. In one or more embodiments, the non-black reinforcing filler will be chemically or physically compatible with the NOR-HALS. In one or more embodiments, the EPDM membrane is devoid of any carbon black fillers. In one or more other embodiments, the EPDM membrane is devoid of any fillers, other than specified UV stabilizers, that absorb UV light. In other embodiments, the EPDM membrane may be devoid of petroleum-derived fillers.

In one or more embodiments, a single type of reinforcing non-black filler may be employed, and in other embodiments two or more reinforcing non-black fillers may be used in conjunction. In one or more embodiments, one or more reinforcing fillers may be employed in conjunction with one or more non-reinforcing fillers. The non-reinforcing fillers may include non-black mineral fillers that do not include groups or moieties that will react with a silane and/or are larger in particle size than the reinforcing fillers.

In one or more embodiments, silica is employed as the non-black reinforcing filler. In one or more embodiments, silica filler is employed alone. In other embodiments, silica filler is included with $TiO_2$. In other embodiments, silica filler is included along with other mineral fillers that do not substantially reinforce the composition.

In one or more embodiments, useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed.

Commercially available forms are available from PPG Industries, Inc. (Monroeville, Pa.), Degussa Corporation (Parsippany, N.J.) and J.M. Huber Corporation (Atlanta, Ga.). One useful commercial product is Rubbersil® RS-150D, which is characterized by a BET surface area of 150 $m^2$/g, tapped density of 230 g/liter, pH (5% in water suspension) of 7, SiO2 content of 98%, Na2SO4 content of 2%, and Al2O3 content of 0.2%. In at least one embodiment, silica filler may be used without any other mineral fillers.

In one or more embodiments, other non-black reinforcing fillers include magnesium hydroxide. In yet other embodiments, non-black reinforcing fillers include aluminum trihydrate.

In one or more embodiments, titanium dioxides may be optionally included. Useful titanium dioxides include rutile forms of titanium dioxide. One useful commercial product is TiPure® R-960 (DuPont), which is a fine, white powder having a specific gravity of 3.90. Another suitable titanium dioxide product is CR-800 (TRONOX), which is believed to be characterized by a titanium dioxide content of about 96% and a specific gravity of about 3.8 to about 4.1.

In one or more embodiments, talc may optionally be included. Useful talc includes hydrated magnesium silicate. In one or more embodiments, talc can be represented by the formulae $Mg_3Si_4O_{10}(OH)_2$ or $3MgO.4SiO_2.H_2O$. Exemplary forms of talc include talcum, soapstone, steatite, cerolite, magnesium talc, steatite-massive, and mixtures thereof. Talc filler may contain various other minerals such as dolomite, chlorite, quartz, and the like. Talc used as filler may also exhibit characteristics such as hydrophobicity, organophilicity, non-polarity, and chemically inertness. A representative commercially available talc is Talc 9107, which is available from Polar Minerals (Mt. Vernon, Ind.), which is non-abrasive, chemically inert, has a specific gravity of about 2.8, a pH of about 8.7, a refractive index of about 1.57 at 23° C., and a moisture content of less than about 0.3 weight percent.

Further suitable talc is Mistron® Vapor Talc, which is available from Luzenac America (Centennial, Colo.). Mistron® Vapor Talc is a soft, ultra-fine, white platy powder having a specific gravity of 2.75, a median particle size of 1.7 microns, an average surface area of 18 $m^2$/g, and a bulk density (tapped) of 20 lbs/$ft^3$. Other talcs commercially available from Luzenac America (Centennial, Colo.), include Vertal MB, and Silverline 002. In one embodiment, talc is characterized as a platy, chemically inert filler having a specific gravity of from about 2.6 to about 2.8, a pH of about 7, and a moisture content of less than about 0.5 weight percent.

While, in one or more embodiments, clays may be used, in other embodiments, the present invention is devoid of the use of clays of all types. Where clays are used, useful clays include hydrated aluminum silicates. In one or more embodiments, useful clays can be represented by the formula $Al_2O_3.SiO_2.XH_2O$. Exemplary forms of clay include kaolinite, montmorillonite, atapulgite, illite, bentonite, halloysite, and mixtures thereof. In one embodiment, the clay is represented by the formula $Al_2O_3.SiO_2.3H_2O$. In another embodiment, the clay is represented by the formula $Al_2O_3.SiO_2.2H_2O$. In a preferred embodiment, the clay has a pH of about 7.0.

In one or more embodiments, various forms or grades of clays may be employed. Exemplary forms or grades of clay include air-floated clays, water-washed clays, calcined clays, and chemically modified (surface treated) clays. In other embodiments, untreated clays may be used.

Air-floated clays include hard and soft clays. In one or more embodiments, hard clays include those characterized as having a lower median particle size distribution, and higher surface area than soft clays. In one or more embodiments, soft clays include those characterized by having a higher median particle size distribution and lower surface area than hard clays. Hard and soft clays are disclosed in U.S. Pat. Nos. 5,468,550, and 5,854,327, which are incorporated herein by reference.

In one embodiment, the air-floated clays used have a pH of from about 4.0 to about 8.0, and in another embodiment, the pH is about neutral. Useful airfloated clays have an average particle size of less than about 2 microns. Typical airfloated clays have a specific gravity of around 2.6 g/cc.

Airfloated clays, both hard and soft, are available through various sources. Available from Unimin Corporation (New Canaan, Conn.) is Snobrite™ AF, which is an airfloated hard clay having a pH of about 5.5 to 7.5, a median particle size of about 1 micron, and a specific gravity of about 2.6 g/cc. Available from Kentucky-Tennessee Clay Company (Mayfield, Ky.) is Paragon, which has a pH of about 4.5 to 5.5, a median particle size of about 1 micron, and a specific gravity of about 2.6 g/cc, and Tennessee Clay No. 6, an airfloated hard clay with a pH of from about 5.5 to 6.5, a median particle size of about 1.0 micron, and a specific gravity of about 2.6. A soft airfloated clay from Unimin Corporation (New Canaan, Conn.) is Hi White R®, which has a pH of about 6.25, a median particle size of less than about 1 micron, and a specific gravity of about 2.6 g/cc, Alumex, and Suprex, all airfloated soft clays. Available from J.M. Huber Corporation (Atlanta, Ga.) is Barden R, and LGB, which are both airfloated hard clays, and K-78, an airfloated soft clay. Available from R.T. Vanderbilt Company (Norwalk, Conn.) is McNamee Clay, which is an airfloated soft clay having a pH of about 5.0 to 7.5, a median particle size of about 1 micron and a specific gravity of about 2.6 g/cc.

Water washed clays include those clays that are more closely controlled for particle size by the water fractionation process. This process permits the production of clays within controlled particle size ranges. In one embodiment, the average particle size of the clay is less than about 2 microns in diameter. In another embodiment, the pH of the clay is about 7. Available from J.M. Huber Corporation (Atlanta, Ga.) are water washed clays such as Polyfil® DL, Polyfil® F, Polyfil® FB, Polyfil® HG-90, Polyfil® K and Polyfil® XB. In one embodiment, a water washed kaolin clay includes hydrated aluminum silicate, which has a pH of from about 6 to about 7.5, and a specific gravity of about 2.6 g/cc.

Calcined clays include those that result from the removal of water contained in clays (clays typically contain about 14% water) by calcination. The amount of bound water removed determines the degree of calcination. In one embodiment, the average particle size of the clay is less than about 2 microns in diameter. In another embodiment, the pH of the clay is about 7. Available from J.M. Huber Corporation (Atlanta, Ga.) are calcined clays such as Polyfil® 40, Polyfil® 70, and Polyfil® 80.

Chemically modified (surface treated) clays include those that have cross-linking ability, which can be imparted to the clay by modifying the surface of individual particles with a polyfunctional silane coupling agent. In one embodiment, the average particle size of the clay is less than about 2 microns in diameter. In another embodiment, the pH of the clay is about 7. Available from J.M. Huber Corporation (Atlanta, Ga.) are Nucap® 100 G, Nucap® 200, Nucap® 190, Nucap® 290, Nulok® 321, Nulok® 390, and Polyfil® 368.

In one or more embodiments, UV stabilizers include those compounds known as NOR-HALS. NOR-HALS are considered alkoxyamine hindered amine stabilizers and operate in a similar manner to hindered amine light stabilizer (HALS), but have an O—R group attached to the hindered amine. NOR-HALS, like HALS, have the ability to scavenge radicals which are produced by weathering. This ability may be explained by the formation of nitroxyl radicals through a process known as the Denisov Cycle. The nitroxyl radical(R—O.) combines with free radical in polymers:

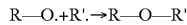

Although they are traditionally considered as light stabilizers, it can also stabilize thermal degradation. NOR-HALS are not a strong base and are not deactivated by HCl.

Because the EPDM membranes and sheeting materials do not include black fillers, UV light is not absorbed into the membranes or materials. However, if UV stabilizers were not present, UV light would deleteriously affect the membranes. UV stabilizers are used to prevent the various effects of UV light, such as oxidation, chain scission and uncontrolled re-combinations and cross-linking reactions. These problems may be caused by photo-oxidation of polymers. Polymers are considered to get weathered due to the direct or indirect impact of heat and ultraviolet light. The effectiveness of the stabilizers against weathering may depend on the solubility, ability to stabilize in different polymer matrix, the distribution in the matrix, evaporation loss during process and the end use.

The NOR-HALS compounds in accordance with the present invention may be derivatives of polyalkylpiperidines which comprise at least one group of the formula

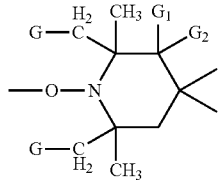

Formula I in which G is hydrogen or methyl and $G_1$ and $G_2$ are hydrogen, methyl or together are =O; the polyalkylpiperidine groups of the formula I or II are preferably substituted in position 4 by one or two polar substituents or a polar spiro ring system Useful examples of such compounds have been disclosed in U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, and 5,300,544, the disclosures of which are incorporated herein by reference.

In one or more embodiments, NOR-HALS compounds may include those compositions of the group of the formula

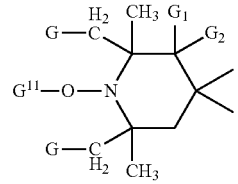

Formula II in which G is hydrogen, $G_1$ and $G_2$ are as defined above and $G^{11}$ is $C_1$-$C_{18}$alkyl, $C_2$-$C_{18}$alkenyl, $C_3$-$C_{18}$alkynyl, $C_5$-$C_{12}$cycloalkyl, $C_6$-$C_{10}$bicycloalkyl, $C_5$-$C_8$cycloalkenyl, phenyl, naphthyl, $C_7$-$C_{12}$phenylalkyl, phenyl or phenylalkyl substituted by alkyl or phenyl having 7 to 14 carbon atoms, or is a group of the formula —CO-D' in which D' has the definitions $C_1$-$C_{18}$alkyl, $C_1$-$C_{18}$alkoxy, phenyl, or phenyl substituted by hydroxy, $C_1$-$C_{18}$alkyl, $C_1$-$C_{18}$alkoxy, amino or amino mono- or disubstituted by $C_1$-$C_{18}$alkyl or phenyl. In one or more embodiments, $G^{11}$ may be $C_1$-$C_{18}$alkyl, $C_3$-$C_8$alkenyl, $C_3$-$C_8$alkynyl, $C_5$-$C_8$cycloalkyl, $C_7$-$C_9$phenylalkyl, $C_2$-$C_{18}$alkanoyl, $C_3$-$C_6$alkenoyl, e.g., $C_1$-$C_{18}$alkyl, $C_5$-$C_8$cycloalkyl or $C_7$-$C_9$phenylalkyl.

In one or more embodiments, NOR-HALS may be defined as comprising the following compounds, the formula of which is

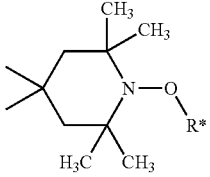

Formula III

R* in this formula is $C_1$-$C_{20}$alkyl, OH-substituted $C_1$-$C_{20}$alkyl, optionally $C_1$-$C_4$ alkyl-substituted $C_5$-$C_{12}$cycloalkyl, $C_7$-$C_9$phenylalkyl or O- or S-interrupted $C_2$-$C_{20}$alkyl, preferably $C_1$-$C_{12}$alkyl, benzyl or $C_5$-$C_8$ cycloalkyl especially $C_6$-$C_{10}$alkyl or cyclohexyl.

In one or more embodiments, the use of alkoxyamine hindered amines (NOR-HALS) provides for several advantages. For example, the processing properties and the physical properties of the resultant compound have, in certain embodiments, proven to be advantageous. For example, cured, white (or non-black), filled EPDM membranes have been shown to have increased weathering resistance properties, based upon ASTM D4637 as compared to cured, white (or non-black), filled EPDM membranes that did not include the NOR-HALS. Thus, for the first time, a new UV radical scavenger can be used in cured, non-black EPDM membranes.

In one or more embodiments, the NOR—HALS compounds are present judiciously to the extent of from 0.01 to 10.0 parts for example to the extent of from 0.05 to 5.0 parts. In other embodiments, they may be present to the extent of from 0.05 to 3.0 parts, but in particular to the extent of from 0.1 to 2.0% by weight. The weight percentages are based on the total amount of these compounds. The basis for calculation in this context is the total weight of the polymer excluding the NOR—HALS compounds.

Further discussion of the NOR—HALS compounds is set forth in U.S. Pat. No. 6,133,414, the disclosure of which is incorporated herein by reference.

In addition to the foregoing ingredients, the vulcanizable compositions of this invention may also optionally include processing oils, mica, calcium carbonate, homogenizing agents, flame retardants, zinc oxide, stearic acid, and mixtures thereof. Certain embodiments may be substantially devoid of any of these constituents.

Processing oils may be used in the present invention. Useful processing oils include paraffinic, naphthenic oils, and mixtures thereof. These oils may be halogenated as disclosed in U.S. Pat. No. 6,632,509, which is incorporated herein by reference. In one or more embodiments, useful processing oils are generally characterized by low sulfur content, low aromaticity, low volatility, and a flash point of more than about 550° F. In one or more embodiments, these processing oils may be referred to as white oils. In one or more embodiments, useful oils have a sulfur content of less than 0.5 weight percent, in other embodiments, less than 0.1 weight percent, in other embodiments less than 0.05 weight percent, and in other embodiments less than 0.01 weight percent sulfur. In one or more embodiments, useful oils have limited unsaturation. In particular embodiments, useful oils have an unsaturation level of less than 3%, in other embodiments less than 1%, in other embodiments less than 0.5%, and in other embodiments less than 0.1%. Useful oils are commercially available. A useful oil is available under the tradename FHR Ultra 1199.

Mica includes mixtures of sodium and potassium aluminum silicate. Mica can be defined by the chemical formula $\alpha\Delta 2\text{-}3(\Omega)4O10(\Sigma)2$, where the $\alpha$ ion is potassium, sodium, barium, calcium, cesium, and/or ammonium, the $\Delta$ ion is aluminum, lithium, iron, zinc, chromium, vanadium, titanium, manganese, and/or magnesium, the $\Omega$ ion is silicon, aluminum, beryllium, boron, and/or iron (+3), and $\Sigma$ is oxygen, fluorine, or hydroxide ion. Micas include true micas, brittle micas, and interlayer-deficient micas. True micas include a majority of singularly charged ions (e.g., potassium and sodium) in the $\alpha$ position. Brittle micas include a majority of doubly charged ions (e.g., calcium or barium) in the $\alpha$ position. Interlayer-deficient micas include fewer cations in the interlayer (the layer between the tetrahedral-octahedral-tetrahedral layers of the crystalline structure) than true or brittle micas.

Examples of true micas include aluminoceladonite (potassium aluminum magnesium iron silicate hydroxide), boromuscovite (potassium boro-silicate hydroxide), celadonite (potassium iron magnesium silicate hydroxide), chromphyllite (potassium chromium aluminum silicate hydroxide fluoride), ferro-aluminoceladonite (potassium aluminum iron magnesium silicate hydroxide), ferroceladonite (potassium iron magnesium silicate hydroxide), muscovite (potassium aluminum silicate hydroxide), nanpingite (cesium aluminum silicate hydroxide), paragonite (sodium aluminum silicate hydroxide), roscoelite (potassium vanadium aluminum silicate hydroxide), tobelite (ammonium aluminum silicate hydroxide), annite (potassium iron aluminum silicate hydroxide), aspidolite (sodium magnesium aluminum silicate hydroxide), biotite (potassium magnesium iron aluminum silicate hydroxide fluoride), eastonite (potassium magnesium aluminum silicate hydroxide), ephesite (sodium lithium aluminum silicate hydroxide), hendricksite (potassium zinc aluminum silicate hydroxide), lepidolite (potassium lithium aluminum silicate fluoride hydroxide), masutomilite (potassium lithium aluminum manganese silicate fluoride), montdorite (potassium iron manganese magnesium aluminum silicate fluoride), norrishite (potassium lithium manganese silicate), polylithionite (potassium lithium aluminum silicate fluoride), phlogopite (potassium magnesium aluminum silicate hydroxide), preiswerkite (sodium magnesium aluminum silicate hydroxide), siderophyllite (potassium iron aluminum silicate hydroxide), tainiolite (potassium lithium magnesium silicate fluoride), tetra-ferriannite (potassium iron silicate hydroxide), tetra-ferriphlogopite (potassium magnesium iron silicate hydroxide), trilithionite (potassium lithium aluminum silicate fluoride), zinnwaldite (potassium lithium iron aluminum silicate fluoride hydroxide), and mixtures thereof.

Examples of brittle micas include chernykhite (barium vanadium aluminum silicate hydroxide), margarite (calcium aluminum silicate hydroxide), anadite (barium potassium iron magnesium aluminum silicate hydroxide), bityite (calcium lithium aluminum beryllium silicate hydroxide), clintonite (calcium magnesium aluminum silicate hydroxide), kinoshitalite (barium magnesium aluminum silicate hydroxide), and mixtures thereof.

Examples of interlayer deficient micas include brammallite (sodium aluminum silicate hydroxide), glauconite (potassium sodium iron aluminum magnesium silicate hydroxide), illite (potassium aluminum silicate hydroxide), wonesite (sodium magnesium aluminum silicate hydroxide), and mixtures thereof.

Useful calcium carbonates include finely ground calcium carbonate. Commercially available forms are available from Harwick Chemical, J. M. Huber Corporation, Georgia Marble, Genstar Stone Products and Omya, Inc.

Useful homogenizing agents include those composed of a mixture of light colored resins having a specific gravity of about 1.0 g/cc at 23° C. and a softening point of about 100° C. One particularly suitable homogenizing agent is available in flake form from Struktol Corporation under the tradename Struktol® 60 NS.

Alumina trihydrates include finely divided, odorless, crystalline, white powders having the chemical formula $Al_2O_3 \cdot 3H_2O$. Alumina Trihydrate can be utilized in the present invention to enhance the green strength of the base polymer. Useful alumina trihydrates have an average particle size ranging from about 0.1 micron to about 5 microns, and more preferably, from about 0.5 micron to about 2.5 microns.

Alumina trihydrate is commercially available from Franklin Industrial Materials, of Dalton, Ga. Notably, alumina trihydrate can also be advantageously used separately as a flame retardant and smoke suppressant in the EPDM-based roofing membrane composition of the present invention.

Other sources of alumina trihydrate are available from J. M. Huber Corporation of Norcross, Ga. under the trademark Micral®. These alumina trihydrates have a median particle size of about 1.1 microns to about 1.5 microns, a specific gravity of about 2.42, an ash content of about 64-65 weight percent and a loss on ignition at 1000° F. of about 34.65 percent by weight.

Still, an additional useful non-combustible mineral filler suitable for the present invention is the ore of calcium borate. This filler is available in various particle size grades from American Borate Company, Virginia Beach, Va., under the tradename Colemanite® and has the chemical formula $Ca_2B_6O_{11} \cdot 5H_2O$. Colemanite® has a specific gravity of about 2.4. Colemanite® may have an average particle size of about 0.1 to about 5 microns, or from about 0.5 to about 2.5 microns.

Yet another flame-retardant mineral filler which may be particularly suitable for use in the roofing membrane of the present invention is magnesium hydroxide. Useful magnesium hydroxides ($Mg(OH)_2$) include finely divided, white powders that are extremely effective smoke suppressants as well as a flame-retardant additives.

In one or more embodiments, the EPDM membranes of this invention include at least about 20%, in other embodiments at least 25%, and in other embodiments at least about 30% by weight olefinic rubber based on the entire weight of the membrane. In one or more embodiments, the polymeric membranes of this invention include less than 100%, in other embodiments, less than 50%, and in other embodiments less than about 40% by weight olefinic rubber based on the entire weight of the membrane. It will be appreciated that by the term "membrane" as used throughout may refer to the entire membrane, in the case of a mono-layer membrane, or to the non-black layer of a multi-layered membrane.

In one or more embodiments, the total content of the fillers used in the production of the membranes are less than 300 parts by weight mineral filler per 100 parts by weight rubber. It will be understood that parts by weight of the component per 100 parts by weight of the rubber (e.g., elastomeric copolymer) can be referred to as phr. It will also be appreciated that reference to the level or amount of filler in the vulcanizable composition corresponds to the level or amount of filler in the non-black membrane or non-black layer or the membrane. In other embodiments less than 220 phr, in other embodiments less than 200 phr, and in other embodiments less than 180 phr filler may be included in the membranes. In one or more embodiments, the vulcanizable compositions (and non-black layers of the membranes) include more than 10 phr, in other embodiments more than 120 phr, and in other embodiments more than 200 phr of the filler. Inasmuch as the ingredients of the vulcanizable composition of matter are employed to make a non-black membrane (or layer thereof), the fillers employed are non-black.

In one or more embodiments, at least a threshold amount of the filler included in the vulcanizable composition is a non-black reinforcing filler. In one or more embodiments, at least 25% by weight, in other embodiments at least 35% by weight, in other embodiments at least 45% by weight of the filler is a non-black reinforcing filler.

In one or more embodiments, silica is employed as a reinforcing non-black filler. It will be appreciated that silica filler can provide the entire content of the fillers for the polymeric membrane. In one or more other embodiments, the filler content can include silica filler and titanium dioxide. In one or more other embodiments, the total filler content can include silica filler, titanium dioxide and talc. In one or more embodiments, titanium dioxide is considered non-reinforcing filler.

In one or more embodiments, the vulcanizable compositions include at least 15 phr, in other embodiments at least 20 phr, in other embodiments at least 20 phr, and in other embodiments at least 25 phr of silica filler. In one or more embodiments, the vulcanizable compositions may include less than 250 phr, in other embodiments, less than 200 phr, in other embodiments less than 90 phr, and in other embodiments less than 80 phr silica filler.

In one or more embodiments, the vulcanizable composition of this invention include at least 20 phr, in other embodiments at least 25 phr, in other embodiments at least 35 phr, in other embodiments at least 45 phr, and in other embodiments at least 55 phr titanium dioxide. In one or more embodiments, the vulcanizable composition may include less than 90 phr, in other embodiments less than 80 phr, in other embodiments less than 75 phr, in other embodiments less than 60 phr, and in other embodiments at least 65 phr titanium dioxide.

In one or more embodiments, the vulcanizable compositions of this invention are devoid of talc. In one or more embodiments, the vulcanizable composition of this invention include at least 5 phr and in other embodiments at least 15 phr talc. In one or more embodiments, the vulcanizable composition may include less than 90 phr and in other embodiments less than 50 phr talc.

In certain embodiments, the vulcanizable composition is devoid of mica. In other embodiments, the vulcanizable composition of the invention may include at least 6 phr and in other embodiments at least 12 phr mica. In one or more embodiments, the vulcanizable composition may include less than 25 phr and in other embodiments less than 12 phr mica.

In certain embodiments, the vulcanizable composition includes limited clay. In particular embodiments, the vulcanizable composition is devoid of clay. In one or more embodiments, the vulcanizable composition includes less than 15 phr, in other embodiments less than 10 phr, in other embodiments less than 5 phr, and in other embodiments less than 1 phr clay.

In certain embodiments, the vulcanizable composition is devoid of calcium carbonate. In other embodiments, the vulcanizable compositions of the invention may include at least 3 phr and in other embodiments at least 5 phr calcium carbonate. In one or more embodiments the vulcanizable composition may include less than 200 phr and in other embodiments less than 20 phr calcium carbonate.

In one or more embodiments, the vulcanizable composition includes at least 0.25 phr NOR-HALS, in other embodiments at least 1.5 phr, in other embodiments, at least 3 phr, in other embodiments at least 5 phr, and in other embodiments at least 10 phr. In one or more embodiments, the composition may include less than 10 phr NOR-HALS, and in other embodiments less than 5 phr.

In one or more embodiments, the polymeric membranes of this invention include at least 30 phr, in other embodiments at least 40 phr, and in other embodiments at least 50 phr processing oil. In one or more embodiments, the membrane of the invention may include less than 120 phr, and in other embodiments less than 100 phr, and in other embodiments less than 50 phr processing oil.

The roofing membrane of the present invention can be prepared by conventional means using conventional rubber compounding equipment such as Brabender, Banbury, Sigma-blade mixer, two-roll mill, or other mixers suitable for forming viscous, relatively uniform admixtures. Mixing techniques depend on a variety of factors such as the specific types of polymers used, and the fillers, processing oils, waxes and other ingredients used. In one or more embodiments, the ingredients can be added together in a single shot. In other embodiments, some of the ingredients such as fillers, oils, etc. can first be loaded followed by the polymer. In other embodiments, a more conventional manner can be employed where the polymer is added first followed by the other ingredients.

Mixing times generally range from about 2 to 6 minutes. In certain embodiments an incremental procedure can be used whereby the base polymer and part of the fillers are added first with little or no process oil, the remaining fillers and process oil are added in additional increments. In other embodiments, part of the EPDM can be added on top of the fillers, plasticizers, stabilizers etc. This procedure can be further modified by withholding part of the process oil, and then adding it later. In one or more embodiments, two-stage mixing can be employed.

The sulfur cure package (sulfur/accelerator) can be added near the end of the mixing cycle and at lower temperatures to prevent premature crosslinking of the EPDM polymer chains. When utilizing a type B Banbury internal mixer, the dry or powdery materials such as non-black mineral fillers (i.e., untreated clay, treated clays, talc, mica, and the like) can be added first, followed by the liquid process oil and finally the polymer (this type of mixing can be referred to as an upside-down mixing technique).

The NOR-HALS can be added with the fillers near the beginning of the mixing cycle. In one or more embodiments, the NOR-HALS is included before the sulfur cure package is added.

Once mixed, the rubber composition can then be formed into a sheet via calendering. The compositions of the invention can also be formed into various types of articles using other techniques such as extrusion.

The resultant rubbery compositions may be prepared in sheet form in any known manner such as by calendering or extrusion. The cured sheets may also be cut to the desired dimensions. In one or more embodiments, the resulting admixture can be sheeted to thicknesses ranging from 5 to 200 mils, in other embodiments from 35 to 90 mils, by using conventional sheeting methods, for example, milling, calendering or extrusion. In one or more embodiments, the non-black admixture is sheeted to the desired thickness and then bonded to a black sheeting material having essentially the same characteristics as the non-black sheeting material of the present invention using conventional processing techniques. Typically, the plies are calendered separately and then laminated together in an uncured state, to be dusted and cured in an autoclave or by other means. The sheeting can be visually inspected and cut to the desired length and width dimensions after curing.

The calendered sheeting itself should show good, uniform release from the upper and lower calender rolls and have a smooth surface appearance (substantially free of bubbles, voids, fish eyes, tear drops, etc.). It should also have uniform release from the suction (vacuum) cups at the splicing table and uniform surface dusting at the dust box.

In one or more embodiments, the rubber formulations disclosed herein for fabricating membranes are employed in the manufacture of bilaminate membranes wherein the non-black rubber formulations are employed to produce at least one layer of the laminate membranes. In particular embodiments, the non-black formulations disclosed herein are employed to prepare a first layer, and the second layer can derive from a distinct rubber formulation. In one or more embodiments, the distinct rubber formulation (i.e. the rubber formulation employed to prepare the second layer) includes carbon black. Rubber formulations that include elastomeric copolymer and carbon black are generally known in the art as disclosed in U.S. Pat. Nos. 6,632,509, 6,615,892, 5,700,538, 5,703,154, 5,804,661, 5,854,327, 5,093,206, and 5,468,550 which are incorporated herein by reference. For example, these black formulations may include elastomeric olefinic copolymer (i.e. rubber), from about 30 to about 160 parts by weight carbon black per 100 parts by weight rubber, 40 to 100 parts by weight oil per 100 parts by weight rubber, and other ingredients such as a cure package, antioxidants, cure activators, and the like. As is known in the art, the carbon black can be replaced or supplemented with other non-black fillers such as clay and talc.

In one or more embodiments, the laminate membranes of the present invention are bilaminates wherein each layer of the membrane accounts for about 50% of the total thickness of the membrane. For example, a 60 mil membrane may include a 30 mil first non-black layer and a 30 mil second carbon black-filled layer. In other embodiments, the thickness of the layers can be different. In fact, it may be advantageous to construct a membrane with a non-black layer that is thinner than the carbon black-filled layer. In one or more embodiments, the thickness of the non-black layer to the carbon black-filled layer may be about 1:3 to about 1:1, in other embodiments from about 1:2.5 to about 1:1.5, or in other embodiments from about 1:2 to about 1:1.8.

The membranes of the present invention can be optionally reinforced with a scrim fabric. In other embodiments, the membranes are devoid of scrim fabric.

The roof sheeting membranes can be evaluated for physical properties using test methods developed for mechanical rubber goods. Typical properties include, among others, tensile strength, modulus, ultimate elongation, tear resistance, ozone resistance, water absorption, dimensional stability, burn resistivity, and cured compound hardness. In some embodiments, the membranes can be tested for weathering resistance using the Xenon Arc test as set forth in ASTM D4637 as presently adopted on the date of filing of this application.

The membranes of this invention can be used as follows. The non-black layer can face upward so as to reflect sunlight, and the black layer should face downward toward the building. As the sheet is unrolled over the roof substructure in a conventional fashion, field seams are prepared by overlapping the edges of a rubber sheet with the edges of an adjacent rubber sheet. The width of the seam can vary depending on the requirements specified by the architect, building contractor, or roofing contractor and thus, do not constitute a limitation of the present invention. Seams can be joined with conventional adhesives such as, for instance, a butyl-based lap splice adhesive, which is commercially available from Firestone Building Products Company as SA-1065. Application can be facilitated by spray, brush, swab or other means known in the art.

Also, field seams can be formed by using a seam tape and a companion primer such as QuickSeam™ tape and Quick Prime Plus™ primer, both of which are commercially available from Firestone Building Products Company of Indianapolis, Ind.

Thus it should be evident that the sheeting material and method of the present invention are highly effective in covering the roof of a building. The invention is particularly suited for use on roofs of buildings, but is not necessarily limited thereto. The sheeting material of the present invention can be used separately with other equipment, methods and the like, such as, for example, for linings for fish ponds, decorative and aquatic gardens, ponds on golf courses, and the like.

In order to demonstrate the practice of the present invention, the following examples have been prepared and tested. The examples should not, however, be viewed as limiting the scope of the invention. Accordingly, for an appreciation of the true scope and breadth of the invention, reference should be made to the following claims.

The white EPDM membrane developmental work, which used to practice the invention, started May 2007. The base formula is an experimental white membrane formulation (see Table 1 below for details). Mixing, curing and testing of the formulations were carried out at FSBP lab in Carmel, Ind.

A two-staged mixing process was used. A 300-gram Brabender internal mixer was used to mix the master batch (50 RPM for 3 min at set temperature of 140 C, drop temperature is 170 C). A 13"×6" two-roll open mill is used to mix the final batch (roll temperature 88 C, the curatives were mixed into MB—stock passes at 25 times between two rolls of the mill).

Uncured compounds were tested in a MDR2000 for their processing properties. Compounds were cured with a hot press for 45 min at 160 C. Cured samples were die-cut and tested according to ASTM D4637 and some of the results are provided in Table 2.

TABLE 1

| | Formulations | | |
|---|---|---|---|
| Compound ID | D2955 | D2976 | D2977 |
| Ingredient | 239230 | | |
| EPDM Royalene 512 | 100.00 | 100.00 | 100.00 |
| Silica RS-150D | 51.20 | 51.20 | 51.20 |
| TiO2 CR800 | 58.20 | 58.20 | 58.20 |
| Mistron Vapor Talc | 40.60 | 40.60 | 40.60 |
| White Oil FHR Ultra 1199 | 59.42 | 59.42 | 59.42 |
| Carbowax 3350 | 1.99 | 1.99 | 1.99 |

TABLE 1-continued

| | Formulations | | |
|---|---|---|---|
| Compound ID | D2955 | D2976 | D2977 |
| Wax Struktle PE H100 | 5.01 | 5.01 | 5.01 |
| Zinc Oxide Kadox 911 | 5.01 | 5.01 | 5.01 |
| Stearic Acid | 2.5 | 2.5 | 2.5 |
| NOR HALS Tinuvin XT833 | 0 | 1.5 | 3 |
| Master Batch Total | 323.9 | 325.4 | 326.9 |
| MB | 323.9 | 325.4 | 326.9 |
| Sulfur | 0.97 | 0.97 | 0.97 |
| Zinc DBDC | 1.46 | 1.46 | 1.46 |
| MBTS | 0.30 | 0.30 | 0.30 |
| Stearic Acid | 0.75 | 0.75 | 0.75 |
| Final Batch Total | 327.4 | 328.9 | 330.4 |

TABLE 2

Selected properties of white EPDM compounds

| Compound ID | D2975 | D2976 | D2977 | ASTM D4637 |
|---|---|---|---|---|
| Compounds mixed at Carmel lab | | | | |
| Property | | | | |
| Minimum Mooney Viscosity, MU | 29.4 | 28.2 | 27.5 | NA |
| Scorch time t5, minute | 18.6 | 20.2 | 20.9 | NA |
| Scorch time t35, minute | 24.7 | 27.4 | 28.8 | NA |
| Dumbbell Tensile 73 F. (45 min/320 F. cure) | | | | |
| 100% Modulus, psi | 216 | 195 | 199 | NA |
| Tensile Strength, psi | 1536 | 1337 | 1352 | 1305 min |
| Elongation at break, % | 722 | 737 | 730 | 300 min |
| Dumbbell Tensile 73 F. (5 hrs/320 F. cure) | | | | |
| 100% Modulus, psi | 259 | 250 | 254 | NA |
| Tensile Strength, psi | 1793 | 1777 | 1766 | NA |
| Elongation at break, % | 713 | 710 | 702 | NA |
| Die C tear resistance 73 F. | | | | |
| Max load 73 F., lb/in (45 min/320 F. cure) | 160 | 155 | 157 | 125 min |
| Max load 73 F., lb/in (5 hrs/320 F. cure | 149 | 150 | 150 | NA |

Additional samples of uncured white EPDM compounds were made and testing performed on those samples as well. These additional samples are set forth in Table 3,

TABLE 3

Additional Formulations and Selected Properties of EPDM Compunds

| Compound No | D3113 (control) | D3114 | D3115 | D3116 | D3117 | D3118 |
|---|---|---|---|---|---|---|
| Formulation | | | | | | |
| R512, ENB = 3.9%, ML1 + 4 = 53, 125 C. | 100.0 | | 100.0 | 100.0 | 100.0 | |
| R4569, ENB/DCPD = 2.4/0.4%, ML1 + 4 = 60, 125 C. | | 100.0 | | | | 100.0 |
| Rubbersill 150 | 51.20 | 51.20 | 51.20 | 51.20 | 51.20 | 51.20 |
| TiO2/CR800, Tronox LLC, d~3.8 | 58.20 | 58.20 | 58.20 | 58.20 | 58.20 | 58.20 |
| Mistron Vapor Talc, d~2.8 | 40.60 | 40.60 | 40.60 | 40.60 | 40.60 | 40.60 |
| FHR Ultra 1199 (White Oil) | 59.42 | 59.42 | 59.42 | 59.42 | 59.42 | 59.42 |

TABLE 3-continued

Additional Formulations and
Selected Properties of EPDM Compunds

| Compound No | D3113 (control) | D3114 | D3115 | D3116 | D3117 | D3118 |
|---|---|---|---|---|---|---|
| Deolink MX silane | 2.00 | 2.00 | 2.00 | 2.00 | 2.00 | 2.00 |
| Carbowax 3350 | 1.99 | 1.99 | 1.99 | 1.99 | 1.99 | 1.99 |
| Afflux PE 12 | 5.01 | 5.01 | 5.01 | 5.01 | 5.01 | 5.01 |
| Kadox 911 (white ZnO), d = 5.6 | 5.01 | 5.01 | 5.01 | 5.01 | 5.01 | 5.01 |
| Vanox ZMTI | | | 1.50 | | | |
| Irganox 1076 or Anox PP18, Tm = 50-55 C. | | | 1.50 | 1.50 | | 1.50 |
| Tinuvin XT833, Tm = 63-75 C. | | | | 1.50 | 1.50 | 1.50 |
| Stearic Acid | 2.50 | 2.50 | 2.50 | 2.50 | 2.50 | 2.50 |
| Master Batch Total | 325.93 | 325.93 | 328.93 | 328.93 | 327.43 | 328.93 |
| MB | 325.93 | 325.93 | 328.93 | 328.93 | 327.43 | 328.93 |
| Sulfur | 1.50 | 1.50 | 1.50 | 1.50 | 1.50 | 1.50 |
| Zinc DBDC (Butazate) | 1.46 | 1.46 | 1.46 | 1.46 | 1.46 | 1.46 |
| MBTS | 0.30 | 0.30 | 0.30 | 0.30 | 0.30 | 0.30 |
| Stearic Acid | 0.75 | 0.75 | 0.75 | 0.75 | 0.75 | 0.75 |
| Fnial Batch Total | 329.94 | 329.94 | 332.94 | 332.94 | 331.44 | 332.94 |
| 3" × 6" cured membrane properties | | | | | | |
| initial weight | 10.6292 | 9.7968 | 10.0673 | 10.5400 | 10.6258 | 10.9453 |
| weight at 24 months | 10.4135 | 9.5992 | 9.8581 | 10.3741 | 10.4395 | 10.7816 |
| Weight loss after 24 months weathering | 0.2157 | 0.1976 | 0.2092 | 0.1659 | 0.1863 | 0.1637 |
| loss less than control (D3113-Dxxx)/D3113 × 100% | 0.00% | 8.39% | 3.01% | 23.09% | 13.63% | 24.11% |

In these tests shown in Table 3, 6 specimens were subjected to exposure testing at New River, Ariz. in accordance with ASTM G90, Spray Cycle 1 (EMMAQUA, day spray with night time wetting). EMMAQUA is an accelerated weathering test using 7 to 8 mirrors to concentrate solar radiation on the testing samples. The specimens were mounted backed on paper faced plywood, with the uncoded side facing the sun. Before original weight was taken, ½ inch was cut from the bottom of each specimen to use as a control. The protective wrap was removed.

Exposure was tested for 24 months. Specimens were inspected and tested every 3 months, wherein they were not subject to exposure for a period of up to 7 days during this time. At 24 months, the weight loss of the specimens due to weathering was recorded. It will be appreciated that the specimens that included the NOR-HALS UV light stabilizer had a lower weight loss than the control specimen which had no such light stabilizer. In fact, the specimens that included both the NOR-HALS UV light stabilizer and the Irganox material, (a typical antioxidant used in rubber products), performed the best in the study.

Furthermore, it is well known that white (or non-black) roofing membranes (both EPDM and TPO) deteriorate during their service on roofs. The typical failure mode is chalking due to polymer degradation. The test results clearly show that the specimens in Table 3 with the NOR-HALS stabilizer reduces chalking after 2 years of extensive weathering.

Various modifications and alterations that do not depart from the scope and spirit of this invention will become apparent to those skilled in the art. This invention is not to be duly limited to the illustrative embodiments set forth herein.

What is claimed is:

1. A bilaminate roofing membrane comprising:
   (i) a first layer including a sulfur-cured EPDM rubber, where the first layer includes silica and a UV light stabilizer dispersed within the EPDM rubber, where the UV light stabilizer is a NOR-HALS compound defined by the formula

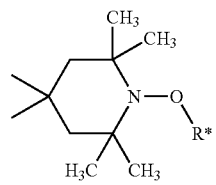

wherein R* is $C_1$-$C_{20}$alkyl, OH-substituted $C_1$-$C_{20}$alkyl, optionally $C_1$-$C_4$ alkyl-substituted $C_5$-$C_{12}$cycloalkyl, $C_7$-$C_9$phenylalkyl or O- or S-interrupted $C_2$-$C_{20}$alkyl;
   (ii) a second layer including a sulfur-cured EPDM rubber, where the second layer includes carbon black dispersed within the EPDM rubber, where the second layer is substantially devoid of the NOR-HALS compound; and
   (iii) optionally a scrim disposed between said first and second layers.

2. The bilaminate roofing membrane of claim 1, where R* is $C_1$-$C_{12}$alkyl, benzyl, or $C_5$-$C_8$ cycloalkyl.

3. The bilaminate roofing membrane of claim 2, where R* is $C_6$-$C_{10}$alkyl or cyclohexyl.

4. The bilaminate roofing membrane of claim 1, where said first layer further includes titanium dioxide.

5. The bilaminate roofing membrane of claim 1, where said first layer further includes a vulcanizing accelerator or residue thereof.

6. The bilaminate roofing membrane of claim 5, where the vulcanizing accelerator is selected from the group consisting of thioureas, thiuram monosulfides and disulfides, benzothiazole sulfonamides, thiazole accelerators, and dithiocarbamates.

7. The bilaminate roofing membrane of claim 4, where said first layer further includes mica.

8. A roofing membrane comprising at least one non-black layer prepared from a vulcanizable composition of matter including:
- an EPDM rubber;
- a non-black filler including silica;
- a UV light stabilizer selected from the group consisting of NOR-HALS of the formula

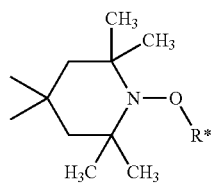

wherein R* is $C_1$-$C_{20}$alkyl, OH-substituted $C_1$-$C_{20}$alkyl, optionally $C_1$-$C_4$ alkyl-substituted $C_5$-$C_{12}$cycloalkyl, $C_7$-$C_9$phenylalkyl or O- or S-interrupted $C_2$-$C_{20}$alkyl;
wherein the vulcanizable composition of matter contains from about 0.01 to about 10 wt. % of the UV light stabilizer; and
- a cure package.

9. The roofing membrane of claim 8, where the membrane includes first and second layers laminated to each other, optionally with a scrim disposed there between, where the first layer is the at least one non-black layer and the second layer is a black layer.

10. The roofing membrane of claim 9, where the black layer is prepared from a vulcanizable composition including EPDM rubber, carbon black, and a cure package.

11. The roofing membrane of claim 10, where the vulcanizable composition used to prepare the black layer is substantially devoid of NOR-HALS.

12. The roofing membrane of claim 8, where the vulcanizable composition further includes a vulcanization accelerator selected from the group consisting of thioureas, thiuram monosulfides and disulfides, benzothiazole sulfonamides, thiazole accelerators, and dithiocarbamates.

13. The roofing membrane of claim 12, where the EPDM rubber forms a rubber component, and where the rubber component consists essentially of the EPDM rubber.

14. The roofing membrane of claim 1, wherein the roofing membrane provides increased weathering resistance as tested according to the Xenon Arc test of ASTM D4637.

15. A method for the production of a roofing membrane, the method comprising:
(i) mixing an EPDM rubber, silica, a curative, and a UV stabilizer selected from the group consisting of NOR-HALS of the formula

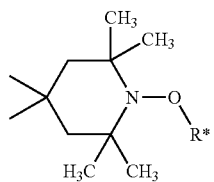

wherein R* is $C_1$-$C_{20}$alkyl, OH-substituted $C_1$-$C_{20}$alkyl, optionally $C_1$-$C_4$ alkyl-substituted $C_5$-$C_{12}$cycloalkyl, $C_7$-$C_9$phenylalkyl or O- or S-interrupted $C_2$-$C_{20}$alkyl, wherein the vulcanizable composition contains from about 0.01 to about 10 wt. % of the UV light stabilizer;
(ii) calendering the vulcanizable composition into one or more layers to form a sheet; and
(iii) curing the sheet such that the EPDM rubber has improved resistance to UV light as compared to an EPDM membrane made comparably, but without the same UV stabilizer.

16. The method of claim 15, where the curative is sulfur, and where the vulcanizable composition further includes a vulcanization accelerator.

17. The method of claim 16, where the vulcanization accelerator is selected from the group consisting of thioureas, thiuram monosulfides and disulfides, benzothiazole sulfonamides, thiazole accelerators, and dithiocarbamates.

* * * * *